(12) United States Patent
Martynov et al.

(10) Patent No.: US 7,653,731 B2
(45) Date of Patent: Jan. 26, 2010

(54) MANAGEMENT OF CONNECTIONS TO EXTERNAL DATA

(75) Inventors: Alexander Martynov, Sammamish, WA (US); Brian Boon, Redmond, WA (US); Howard J Dickerman, Bellevue, WA (US); Patrick J King, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 458 days.

(21) Appl. No.: 11/361,502

(22) Filed: Feb. 24, 2006

(65) Prior Publication Data

US 2007/0204019 A1    Aug. 30, 2007

(51) Int. Cl.
G06F 15/16 (2006.01)
G06F 3/048 (2006.01)
G06F 15/173 (2006.01)
G06F 15/177 (2006.01)

(52) U.S. Cl. ............... 709/227; 715/764; 709/223; 709/220

(58) Field of Classification Search .......... 715/200
See application file for complete search history.

(56) References Cited

U.S. PATENT DOCUMENTS

| | | | |
|---|---|---|---|
| 5,293,615 A | 3/1994 | Amada | |
| 5,721,847 A | 2/1998 | Johnson | |
| 5,883,623 A | 3/1999 | Cseri | |
| 6,531,497 B1 | 3/2003 | Nicolaou et al. | |
| 6,605,122 B1 | 8/2003 | Hearn et al. | |
| 6,898,760 B2 | 5/2005 | Bedford et al. | |
| 6,948,134 B2 | 9/2005 | Gauthier et al. | |
| 2005/0021513 A1 | 1/2005 | Vedula et al. | |
| 2005/0091206 A1 | 4/2005 | Koukerdjinian et al. | |
| 2005/0097447 A1 | 5/2005 | Serra et al. | |
| 2005/0149482 A1 | 7/2005 | Dillon | |

OTHER PUBLICATIONS

Baron et al., "Access Cookbook", Feb. 2002, O'Reilly, p. 1-6 (Recipe 13.5).*
Viescas, "Microsoft Office Access 2003 Inside Out", Microsoft Press, Oct. 2003, p. 1-11 (Chapter 27).*
Conrad, "Managing Data with Microsoft Excel", Que, May 2004, p. 1-19 (Chapter 4).*
Craig Stinson, "Microsoft Office Excel 2003", Sep. 2003, Microsoft Press, p. 1-33.*
author unknown, "About using connection files", 2003, Microsoft, p. 1-2.*
Durant, J.R., "Importing XML Maps, XML lists, and Dynamic Chart Sources in Excel 2003," © 2006 Microsoft Corporation, <http://msdn.microsoft.com/office/understanding/excel/technicalarticles/default.aspx?pull=/library/en-us/odc_x12003_ta/html/odc_HXMLlsts.asp.

(Continued)

*Primary Examiner*—Patrice Winder
*Assistant Examiner*—Taylor Elfervig
(74) *Attorney, Agent, or Firm*—Merchant & Gould

(57) ABSTRACT

Embodiments of present application treat Connection Information Files contained in an instance of an application, such as a workbook, as independent objects and multiple data objects, such as data summary tables, may link to one Connection Information File. Maintaining Connection Information Files as independent objects within an instance of an application provides the ability to modify a connection to an external data source and have that modification applied to all linked data objects without having to modify each data object individually. Additionally, a user may view a complete list of all Connection Information Files that exist within a workbook and easily add, delete, or modify those Connection Information Files.

19 Claims, 11 Drawing Sheets

OTHER PUBLICATIONS

"Excel Connection Manager," © 2006 Microsoft Corporation, <http://msdn2.microsoft.com/en-us/library/ms139836.aspx>.

Hertvik, J., "Admin Alert: An Easy Way to Import OS/400 Data into Excel,". © 1996-2003 Guild Companies, Inc., <http://www.itjungle.com/tfh/tfh020303-story04.html>.

* cited by examiner

MANAGEMENT OF CONNECTIONS TO EXTERNAL DATA

BACKGROUND

Many existing applications provide the ability to obtain data from an external source and use that data for a variety of purposes. For example, Microsoft Excel® is capable of obtaining data from an external data source, such as a database, and using that information in a workbook. The data from those external sources may be used in a variety of ways.

Existing techniques for connecting with an external data source, such as a Structured Query Language ("SQL") Database or an Online Analytical Processing (OLAP) server, typically utilize a connection file. Generally described, a connection file includes information (referred to herein as "Definition Information") necessary to access an external data source. For example, the Definition Information of a connection file generally includes a name of the external data source, its location, integrated security, provider information, etc.

FIG. 1 is a block diagram of a typical configuration of a group of applications that obtain information from an external data source. In this example, a client 101, such as a stand alone computing device, includes an application 103, such as Microsoft Excel®, that obtains information from an SQL database 107, an external data source. Typically, when a connection to an external data source is established, a connection file 109 is generated and stored on the client 101. Each data object in the application 103, such as data object 1 111, data object 2 113, and data object 3 115, includes an embedded copy of the connection file that is used to access the SQL database 107.

Although embedding a copy of a connection file into each data object provides a means for each data object to connect to an external data source, modifying and/or replacing those connections is challenging for users, and must be done individually for each data object. For example, if data object 1 111, data object 2 113, and data object 3 115 each connect to SQL Database 107, each of those data objects will contain an embedded copy of the configuration file 109. If the external data source is moved, renamed, or if the user desires to change the connection to a different external data source, the embedded configuration file for each data object 111, 113, 115 must be individually modified or replaced. In addition to it being difficult to alter each individual connection file, existing techniques do not provide a simple means by which to identify the connection files that exist within an existing application.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Generally described, embodiments of the present invention treat Connection Information Files contained in an instance of an application, such as a workbook, as independent objects. Multiple data objects, such as data summary tables, may link to one Connection Information File. Maintaining Connection Information Files as independent objects within an instance of an application provides the ability to modify a connection to an external data source and have that modification applied to all linked data objects without having to modify each data object. Additionally, a user may view a complete list of all Connection Information Files that exist within a workbook and easily add, delete, or modify those Connection Information Files.

According to one aspect of the present invention a computer-readable medium having computer executable components for creating and managing Connection Information Files within an instance of an application, such as a workbook, is provided. The computer-readable medium includes a Connection Information File management component, a Connection Information generation component, and a Connection Information File linking component. The Connection Information File management component is configured to maintain a list of existing Connection Information Files within the instance of the application. Each Connection Information File within the instance of the application is treated an independent object. The Connection Information File generation component is configured to generate new Connection Information Files when needed to link to a new external data source or link to an existing external data source in a different manner. The Connection Information File linking component defines links between existing Connection Information Files and data objects, such as a data summary table, within the instance of the application.

In accordance with another aspect of the present invention, a method for creating a Connection Information File within an instance of an application is provided. The method includes receiving a request to create a Connection Information File and determining if a connection file exists that may be used to generate the Connection Information file. If it is determined that a connection information file does exist, Definition Information contained in the existing connection file is copied into the instance and Usage Information which defines how the Connection Information File is to be used in the instance of the application is determined. Finally, a Connection Information File is created within the instance of the application that includes the Definition Information and the Usage information. The created Connection Information File is treated as an independent object within the instance of the application.

In accordance with another aspect of the present invention, a method for creating a data object within an instance of an application, wherein the data object will obtain data from an external data source, is provided. The method includes receiving a request to create a data object and determining if an existing Connection Information File exists within the instance of the application that may be used to define a connection to the external data source. If it is determined that a Connection Information File does not exist, a determination is made as to whether a connection file exists that may be used to define a connection to the external data source. If it is determined that a connection file exists, a Connection Information File is created within the instance of the application based off information contained in the connection file. After a Connection Information File has been created, or after a determination that an existing Connection Information File may be used, the requested data object is created and linked to the Connection Information File.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Embodiments will now be described more fully hereinafter with reference to the accompanying drawings. Embodiments disclosed herein are examples and should not be construed as limiting.

Figure 1:
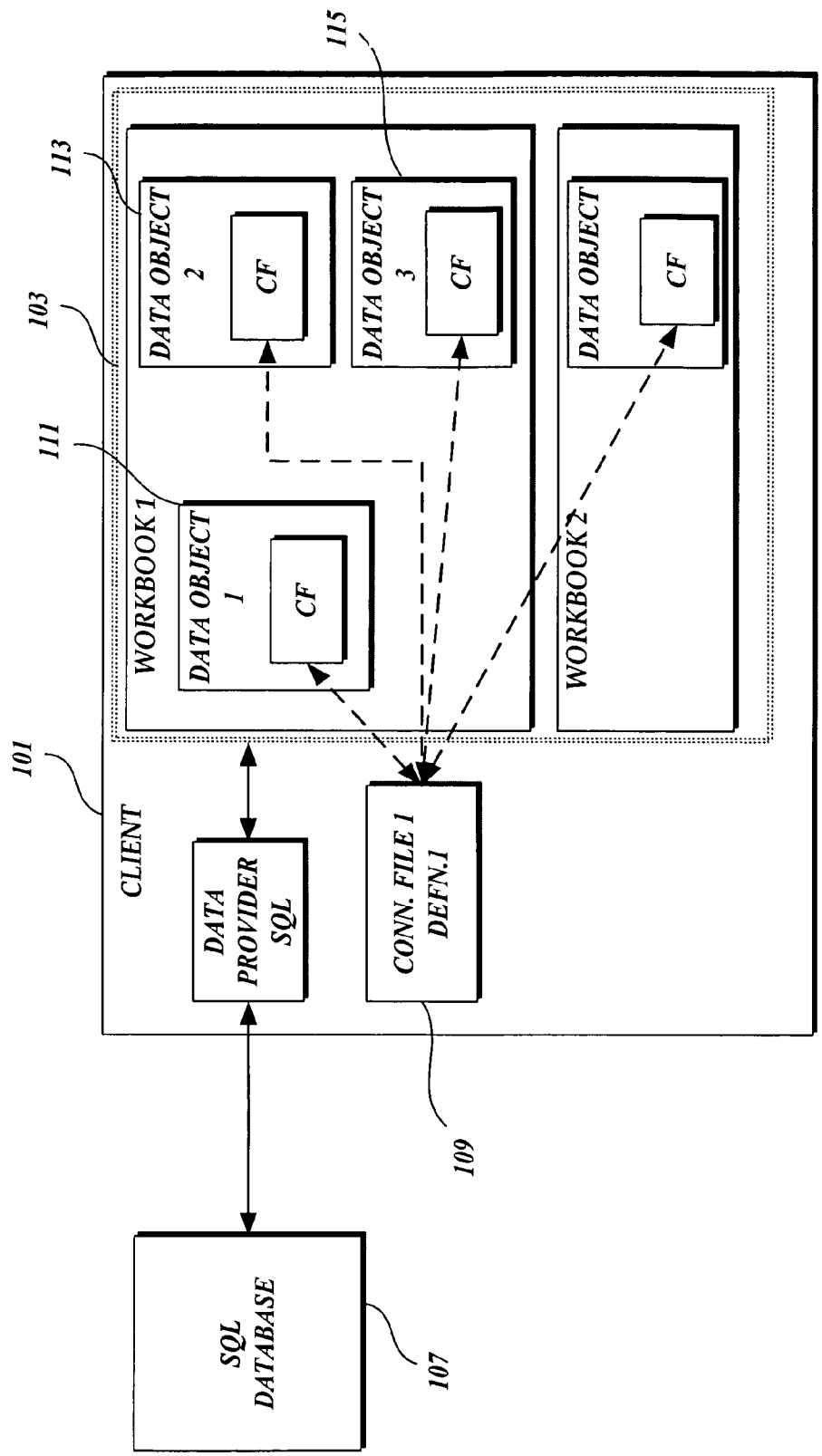
FIG. 1 is a block diagram of a typical configuration of a group of applications that obtain information from an external data source.
Figure 2:
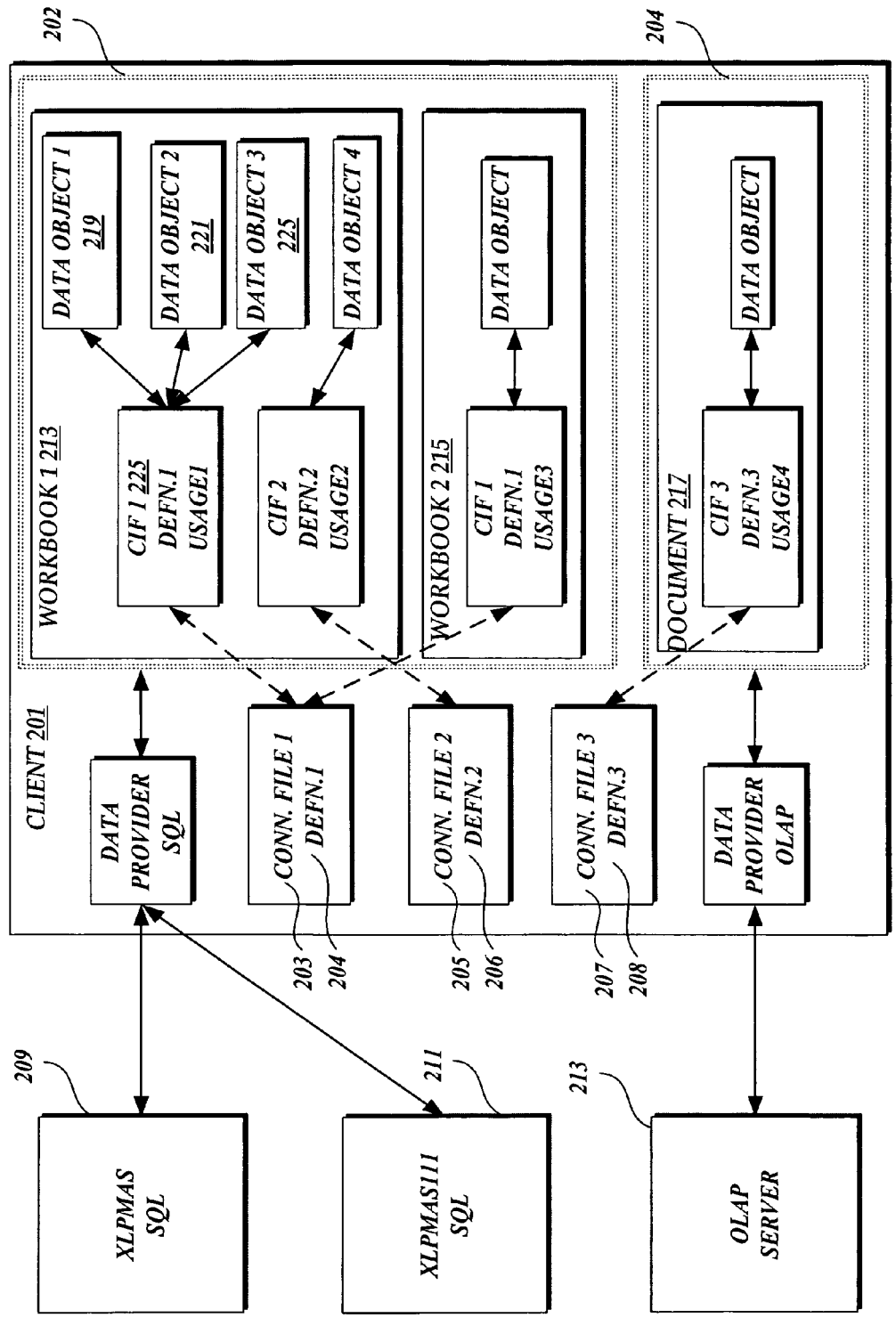
FIG. 2 is a block diagram of an embodiment of the present invention that maintains a "Connection Information File" for each instance of an application, in accordance with an embodiment of the present invention.

FIG. 2 is a block diagram of an embodiment of the present invention that maintains a "Connection Information File" for each instance of an application, in accordance with an embodiment of the present invention. A "Connection Information File," as used herein is the set of information needed to obtain data from an external data source. Connection Information Files are maintained as independent objects within each instance of an application, such as each instance of an Excel® Workbook, each instance of a Microsoft Word® document, etc., and are linked to data objects within those application instances. A "data object," as used herein, is any item within an instance of an application that utilizes data obtained from an external data source. For example, a data object may be, but is not limited to, a data summary table (also know as a Pivot Table), a formula, or a query.

As described in more detail below, a Connection Information File includes a copy of the Definition Information from the connection file and information (referred to herein as "Usage Information") that is specific to the instance of the application. In contrast to existing techniques, a Connection Information File is not part of a data object. In embodiments of the present invention, one or more data objects link to a single Connection Information File. As a result, one Connection Information File may be modified, deleted, or replaced and the change will automatically apply to each linked data object.

As shown in FIG. 2, the client 201 includes three connection files, connection file 1 203, connection file 2 205, and connection file 3 207. Each connection file includes the Definition Information necessary for connecting to an external data source. In particular, connection file 1 203 includes the Definition Information, "Defn.1" 204, necessary for connecting to the SQL database "XLPMAS" 209, connection file 2 205 includes the Definition Information, "Defn.2" 206, necessary for connecting to the SQL database "XLPMAS111" 211, and connection file 3 207 includes the Definition Information, "Defn.3" 208 necessary for connecting to the OLAP server 213. The connection files 203, 205, and 207 may be used by any application on the client 201 to obtain the Definition Information describing how to connect to an external data source. Additionally, any type of external data source may be used with embodiments of the present invention and the discussions of a SQL database and OLAP server are used as examples only.

In the example illustrated in FIG. 2, there are two applications, Excel® 202 and Word® 204, on the client 201 that utilize the connection files to understand how to connect to external data sources. As will be appreciated by one of ordinary skill in the relevant art, any type and number of applications that obtain information from an external data source may be used with embodiments of the present invention and the use of Excel® and Word® are provided herein only as examples and for discussion purposes. Additionally, for ease of explanation, we will refer to each instance of an application as a "workbook" or "document." It will be appreciated that any type of instance of an application may be used with embodiments of the present invention.

Each workbook and document, such as Workbook 1 213, Workbook 2 215, and Document 217, maintain Connection Information Files describing how to connect to an external data source. Those Connection Information Files may be used by one or more data objects within that workbook or document to obtain data from external data sources. Each Connection Information File is an independent object within a workbook. Connection Information Files include the Definition Information necessary for connecting to an external data source and "Usage Information" defining how the connection defined by that Connection Information File is to be used for that workbook. "Usage Information," as used herein, is information specific to the workbook or document that defines how the Connection Information File is to be used in that workbook or document. Usage Information includes, but is not limited to, the workbook name of the Connection Information File and the frequency with which data from the external data source is to be refreshed and provided to linked data objects. Each workbook and/or document may include any number of Connection Information Files, each having unique names within the workbook or document.

Utilizing one Connection Information File that may be used by multiple data objects within a workbook provides the ability to update, change, refresh, or delete a Connection Information File for the entire workbook and the alteration will affect each data object within that workbook that is linked to that Connection Information File. For example, data object 1 219, data object 2 221 and data objects 225 are each linked to Connection Information File 1 225. Connection Information File 1 225 includes Definition Information obtained from connection file 203 that defines how to connect to the XLPMAS SQL database 209. Additionally, the Connection Information File 225 includes Usage Information that specifies how that connection is to be utilized for workbook 1 213. If the connection needs to be refreshed, updated, changed, deleted, or otherwise altered, it may be done at the Connection Information File 225 and the change will automatically affect each of the data objects linked to the Connection Information File 225. As a result, the user does not need to manually alter each copy of the connection file embedded in each data object, as was previously required.

Figure 3A:
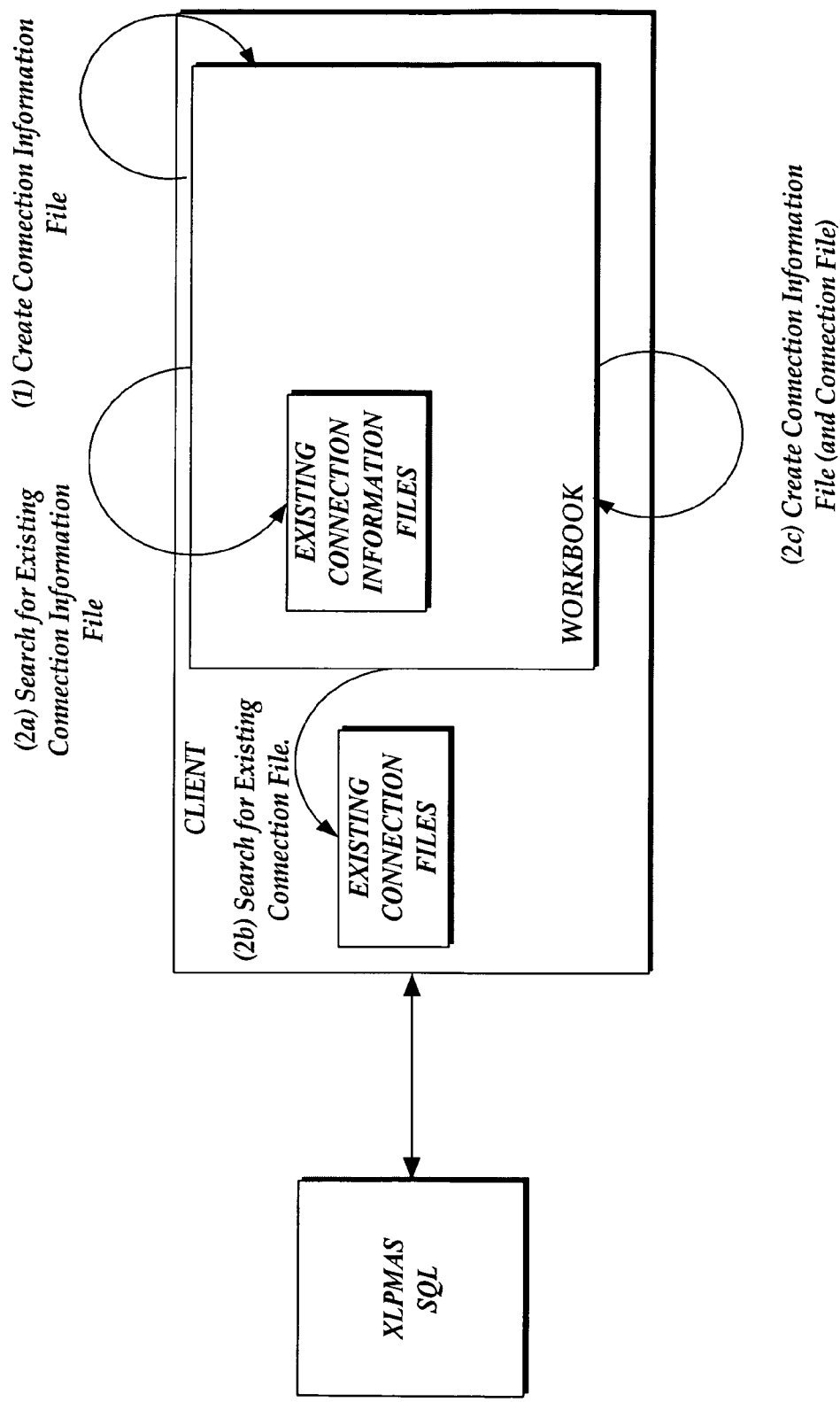
FIGS. 3A and 3B are state transition diagrams providing a high level overview of a system for creating a Connection Information File for a data object in a workbook, in accordance with an embodiment of the present invention.
Figure 3B:
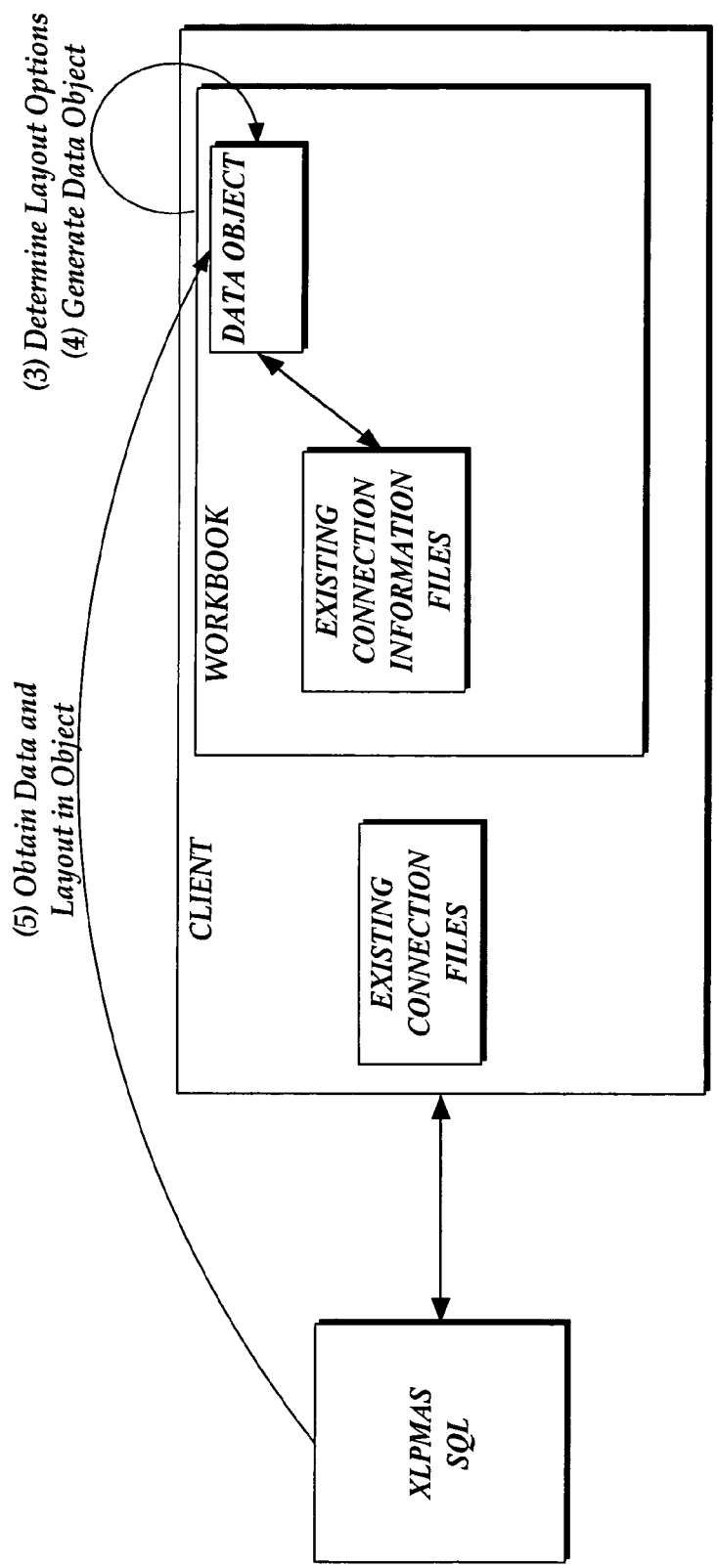

FIGS. 3A and 3B are state transition diagrams providing a high level overview of a system for creating a Connection Information File for a data object in a workbook, in accordance with an embodiment of the present invention. A Connection Information File for a workbook may be created in response to many different user interactions. For example, a user may request to create a Connection Information File without creating a data object that will use the Connection Information File. Alternatively, a user may create a data object that is to be bound to an external data source, and as such, will be linked to a Connection Information File.

Regardless of the technique used to generate a Connection Information File, the system searches for existing Connection Information Files within the workbook. If there are existing Connection Information Files within the workbook, it is determined whether one of those Connection Information Files may be used. For example, if a data object is being established and a Connection Information File exists that may be used for the data object, the system links the data object to the existing Connection Information File.

However, if there is no existing Connection Information File that may be used, the system proceeds to search for existing connection files located on the client computing device, and/or on any connected networks, that may be used. If there is an existing connection file on the client computing device or connected network that may be used, information from that connection file is imported into the workbook. Usage Information defining how the connection is to be used for the workbook is also generated and a Connection Information File is created that includes the imported Definition Information and the generated Usage Information. Finally, if there is no existing Connection Information File or connection file that may be used, a new connection file and Connection Information File are generated based off information provided by the user that defines the connection to an external data source.

In an alternative embodiment, the system may search the workbook for existing Connection Information Files that may be used and search the client computing device, and any connected networks, to identify any connection files that may be used. Each identified Connection Information File and connection file may be provided to the user for selection. In one example, the system may identify existing Connection Information Files in one section, existing connection files located on the client computing device in another section, and existing connection files located on connected networks in another. The user may then select the Connection Information File or connection file that is desired. Alternatively, the user may select to generate a new Connection Information File, as described in more detail below.

Referring to FIG. 3B, if a connection file and Connection Information File are being generated as part of a data object creation, once the connection file and the Connection Information File have been established, the system determines how the data obtained from the external data source is to be laid out in the data object. This may include identifying several different options as to how the data may be laid out and providing those options to a user. The user may then select the desired layout and the data object is generated. Additionally, the data that will be used in the data object is obtained from the external data source, laid out in the data object, and provided to the user.

Figure 4:
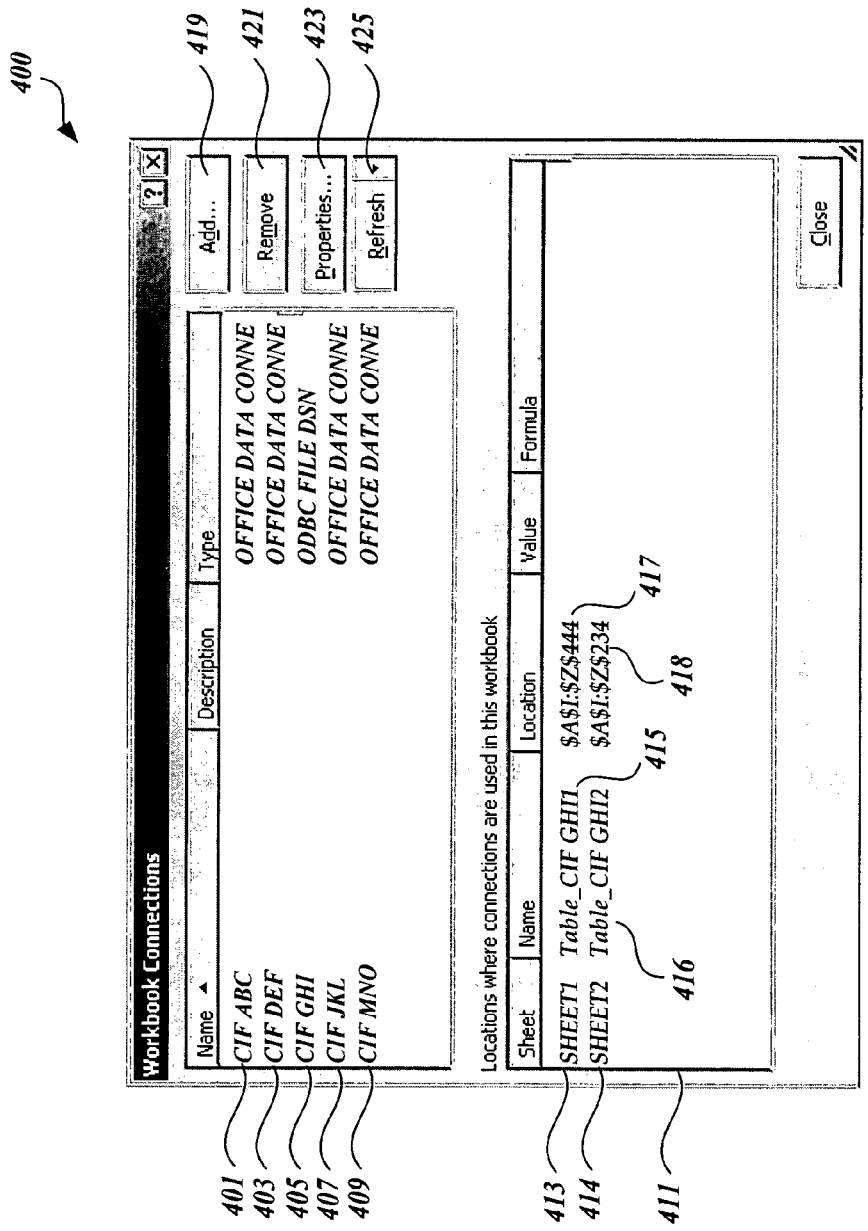
FIG. 4 is a pictorial representation of a workbook connections window, identifying existing Connection Information Files of a workbook, in accordance with an embodiment of the present invention.

FIG. 4 is a pictorial representation of a workbook connections window, identifying existing Connection Information Files of a workbook, in accordance with an embodiment of the present invention. From within a workbook, such as workbook 1 213 (FIG. 2), a user may select to view a list of all existing Connection Information Files for that workbook. In response, a user is provided with a workbook connections window 400 identifying each of the Connection Information Files that currently exist within that workbook. In this example, there are five Connection Information Files, named "CIF ABC" 401, "CIF DEF" 403, "CIF GHI" 405, "CIF JKL" 407, and "CIF MNO" 409. In addition to the list of Connection Information Files, the workbook connection window 400 provides an identification of the type of the connection and optionally a description of the connection.

A user may select one of the Connection Information File names, such as "CIF GHI" 405, and be provided with information identifying the locations within the workbook where the connection is utilized via the locations window 411. For a selected Connection Information File, the locations window 411 displays each sheet within the workbook in which the Connection Information File is used, the Name of the data object linked to the Connection Information File, the Location within the sheet where the Connection Information File is used, and optionally the value and formula at the location where the Connection Information File is used. Continuing with the above example, if a user selects the Connection Information File named "CIF GHI" 405, the locations window 411 identifies that the Connection Information File is used in Sheet1 413 and Sheet2 414. Additionally, within Sheet1 413 the data object linked to the Connection Information File is "Table_CIF GHI1" 415 and its location within Sheet1 is "$A$1:$Z$444" 417. Likewise, the name of the data object in Sheet2 414 is "Table_CIF GHI2" 416 and its location within Sheet2 is "$A$I:$Z$234" 418.

In an alternative embodiment, the locations window 411 may, instead of initially showing each location where a selected Connection Information File is used, simply provide a selectable link that generates a list of locations where the Connection Information File is used. Instances in which a Connection Information File is used a large number of times in a workbook may result in a processing delay due to the large number of linked data objects. Thus, providing a link instead of generating a complete list reduces the processing time and allows the user to select if they desire to see all locations in which the Connection Information File is used within the workbook.

In addition to viewing a comprehensive list of Connection Information Files for a workbook, a user may "Add" 419 additional Connection Information Files to the workbook, "Remove" 421 existing Connection Information Files from the workbook, or "Refresh" 425, one or more of the Connection Information Files of the workbook. Using the "Refresh" selection 425 a user may either refresh the data that is used by the data objects linked to the selected Connection Information File and/or refresh the information (Definition Information) contained in the Connection Information File. Selecting to refresh the external data results in the client accessing the external data source, based on the Definition Information contained in the Connection Information File, and obtaining the desired data. As a result, each data object linked to the selected Connection Information File is automatically updated with a current version of the data obtained from the external data source.

If a user selects to refresh the Definition Information contained in the Connection Information File, the workbook accesses the connection file stored on the client that is associated with the Connection Information File and updates the Definition Information to match the Definition Information contained in the connection file. As with an external data refresh, this update to the Connection Information File will automatically affect each linked data object.

Figure 5:
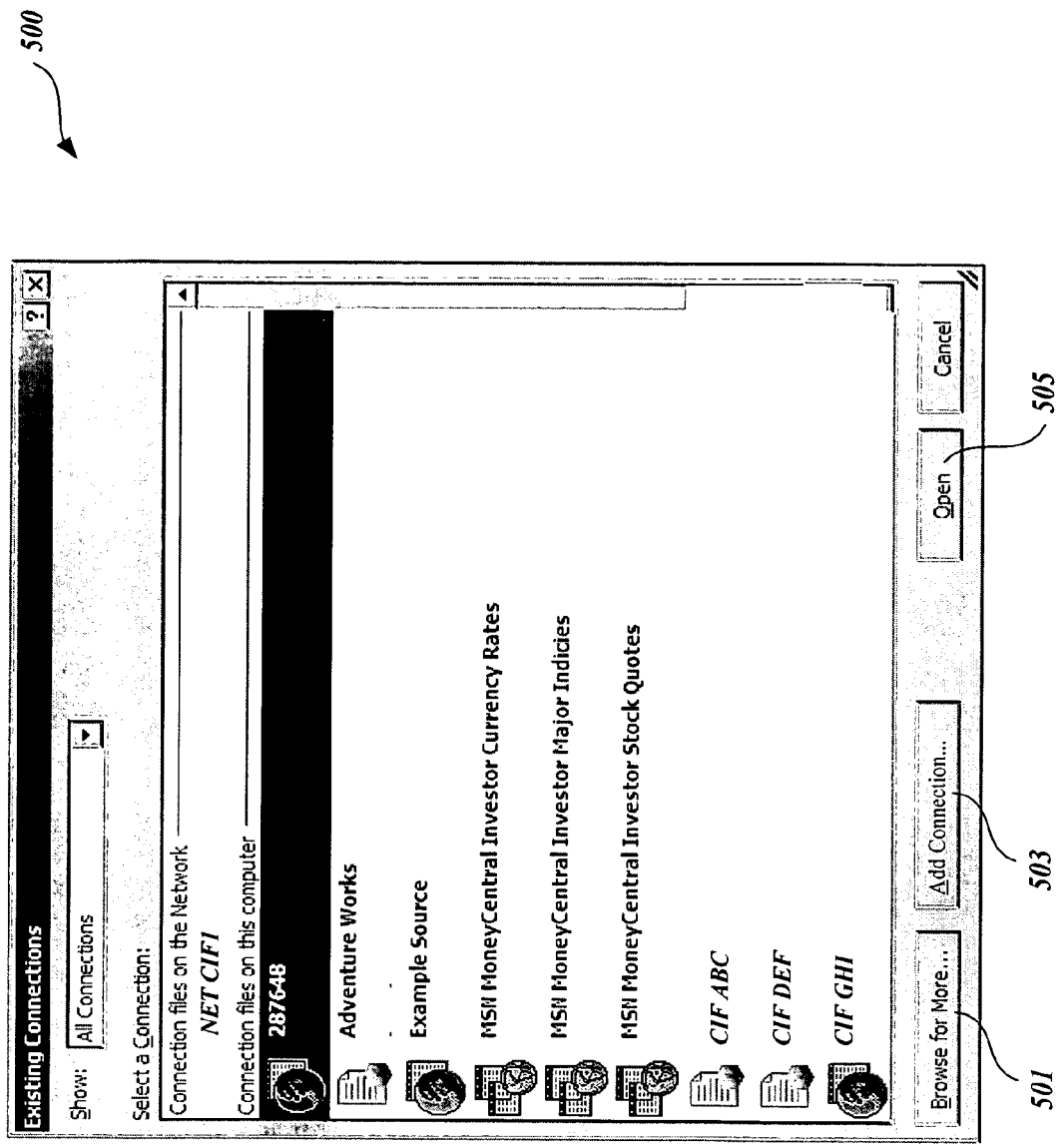
FIG. 5 is a pictorial representation of an Existing Connections Window identifying all connection files that exist on a client or network, in accordance with an embodiment of the present invention.

Selecting to "Add" 419 a Connection Information File provides a user with an Existing Connections Window 500. FIG. 5 is a pictorial representation of an Existing Connections Window identifying all connection files that exist on a client or network, in accordance with an embodiment of the present invention. The Existing Connections Window 500 identifies each existing connection file on the client and any connection files that are available on the network to which the client has access. Additionally, a user may browse for more connections by selecting "Browse for More . . . " 501. If a connection file does not exist for the external data source to which the user desires to connect, the user may also select to "Add a Connection" 503, which will result in the user generating a new connection file that is stored on the client or the network. Creation of connection files is well know to those of skill in the relevant art and will not be described in detail herein.

Additionally, a user may select to "Open" 505 a particular connection file to view the Definition Information of the connection file. Upon viewing the Definition of a selected connection information file, a user may select to create a Connection Information File that utilizes the Definition Information from the selected connection. Creation of a Connection Information File is described in more detail with respect to FIG. 8.

Figure 6:
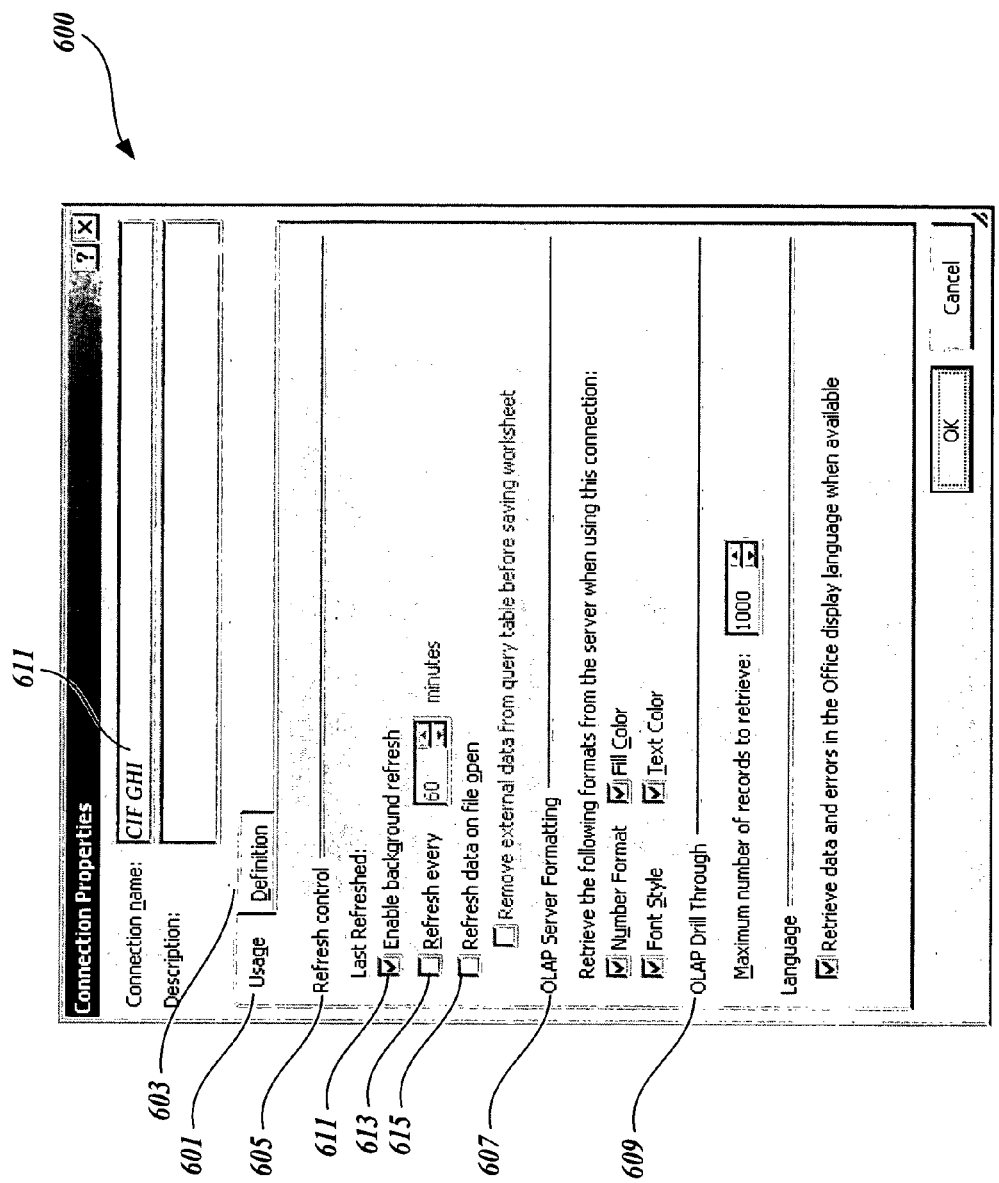
FIGS. 6 and 7 are pictorial representations of a Connection Properties window identifying Usage Information (FIG. 6) and Definition Information (FIG. 7) of a Connection Information File, in accordance with an embodiment of the present invention.
Figure 7:
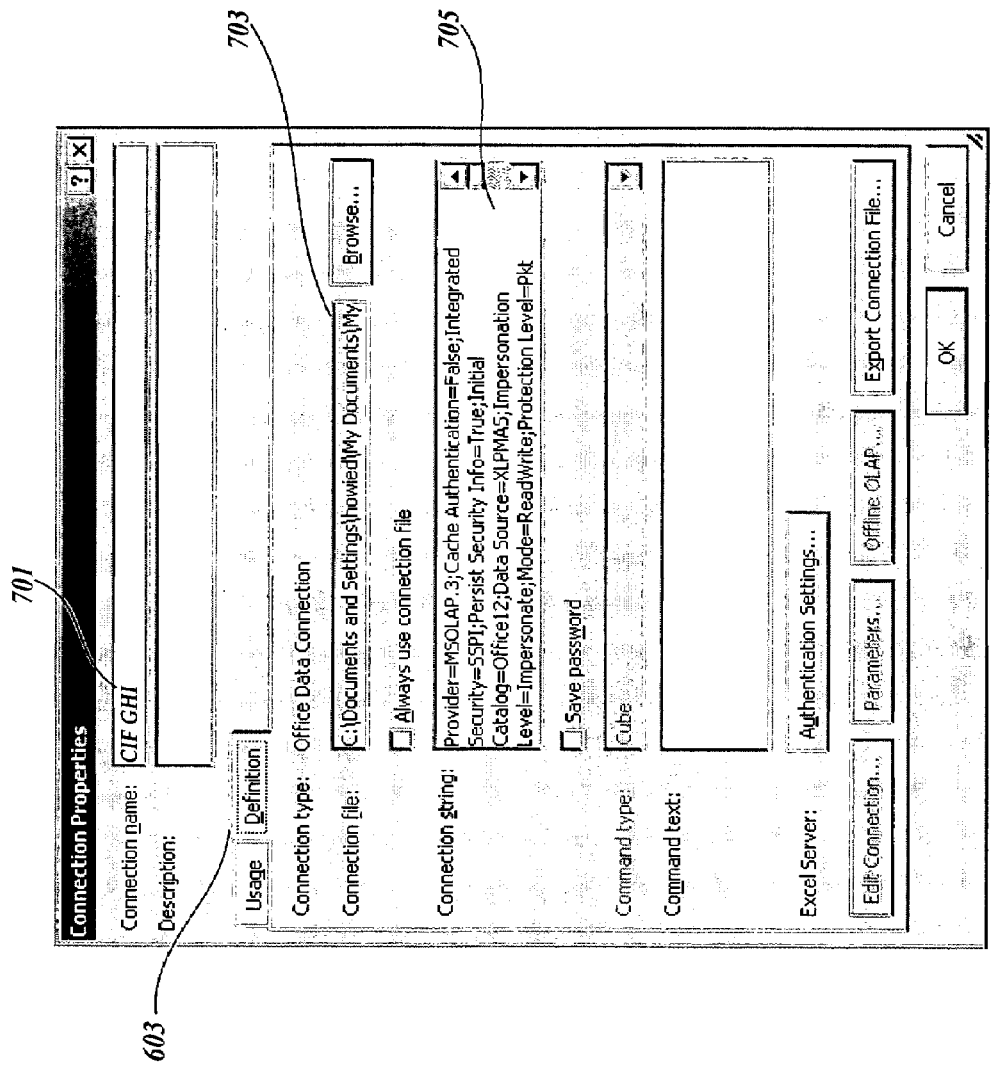

Referring back to FIG. 4, the properties of a Connection Information File may also be viewed by selecting a name of a Connection Information File, such as "CIF GHI" 405, and selecting Properties 423. In response, a Connection Properties window 600 is generated identifying the Usage Information and Definition Information of the selected Connection Information File. FIGS. 6 and 7 are pictorial representations of a Connection Properties window identifying Usage Information (FIG. 6) and Definition Information (FIG. 7) of a Connection Information File, in accordance with an embodiment of the present invention.

Navigation between Usage Information and Definition Information is accomplished via the "Usage" tab 601 and "Definition" tab 603. Referring first to the Usage Information, as discussed above, each Connection Information File includes Usage Information that is unique to the workbook that contains the Connection Information File. Usage Information specifies how the connection defined by the Connection Information File is to be used by data objects of the workbook. For example, the Usage Information may include Refresh information 605 and, in instances where the external data source is an OLAP server, "OLAP Server Formatting" 607 and "OLAP Drill Through" 609 information. The Refresh information 605 allows a user to specify how often data is to be obtained from the external data source and how the refreshing of data from the external data source is to occur. For example, a user may specify that data from an external data source is to be refreshed in the background 611. The user may also specify how often refresh of data from the external data source is to occur 613 and whether external data is to be refreshed when the workbook is opened 615.

From within the Connection Properties window 600, a user may change the name of the Connection Information File. In particular, the Connection Properties window 600 includes a Connection Name box 611 that identifies the name of the Connection Information File. Through interaction with that box 611, a user may alter the name of a Connection Information File. Because Connection Information Files are maintained as independent objects within a workbook, a user may replace a Connection Information File with a different Connection Information File by simply renaming, or deleting, the existing Connection Information File and creating a new Connection Information File using the original name. As a result, each data object within the workbook that links to the Connection Information File, based on the name, will automatically use the new Connection Information File that has the same name as the original Connection Information File.

Referring to FIG. 7, a Definition Information of a Connection Information File is provided in a user friendly interface allowing a user to easily modify and understand the connection that is defined by the Connection Information File. When a Connection Information File is initially created, the Definition Information is obtained from a connection file located on the client or a network to which the client is associated. Included in the Definition Information tab 603 is a connection file identifier box 703 identifying the location and name of the connection file that was used to create the Connection Information File named "CIF GHI" 701. However, if a user modifies the Definition Information of a Connection Information File, the connection file identifier box 703 may be grayed out as the Definition Information in the connection file no longer matches that of the Connection Information File.

The connection string box 705 provides the details of the Definition Information that defines how to connect to the external data source. A user may modify any portion of the information contained in the connection string box 705. For example, if a user desires to modify the Data Source from XLPMAS to a new external data source, such as XLPMAS111 211 (FIG. 2), a user may change that information in the connection string box 705. The change to the Data Source will result in the Connection Information File obtaining information from a different external data source, in this example XLPMAS111 211. Because the Connection Information File is a high level object within the workbook and multiple data objects may be linked to the Connection Information File, this change will result of each linked data object obtaining data from the new external data source.

Figure 8:
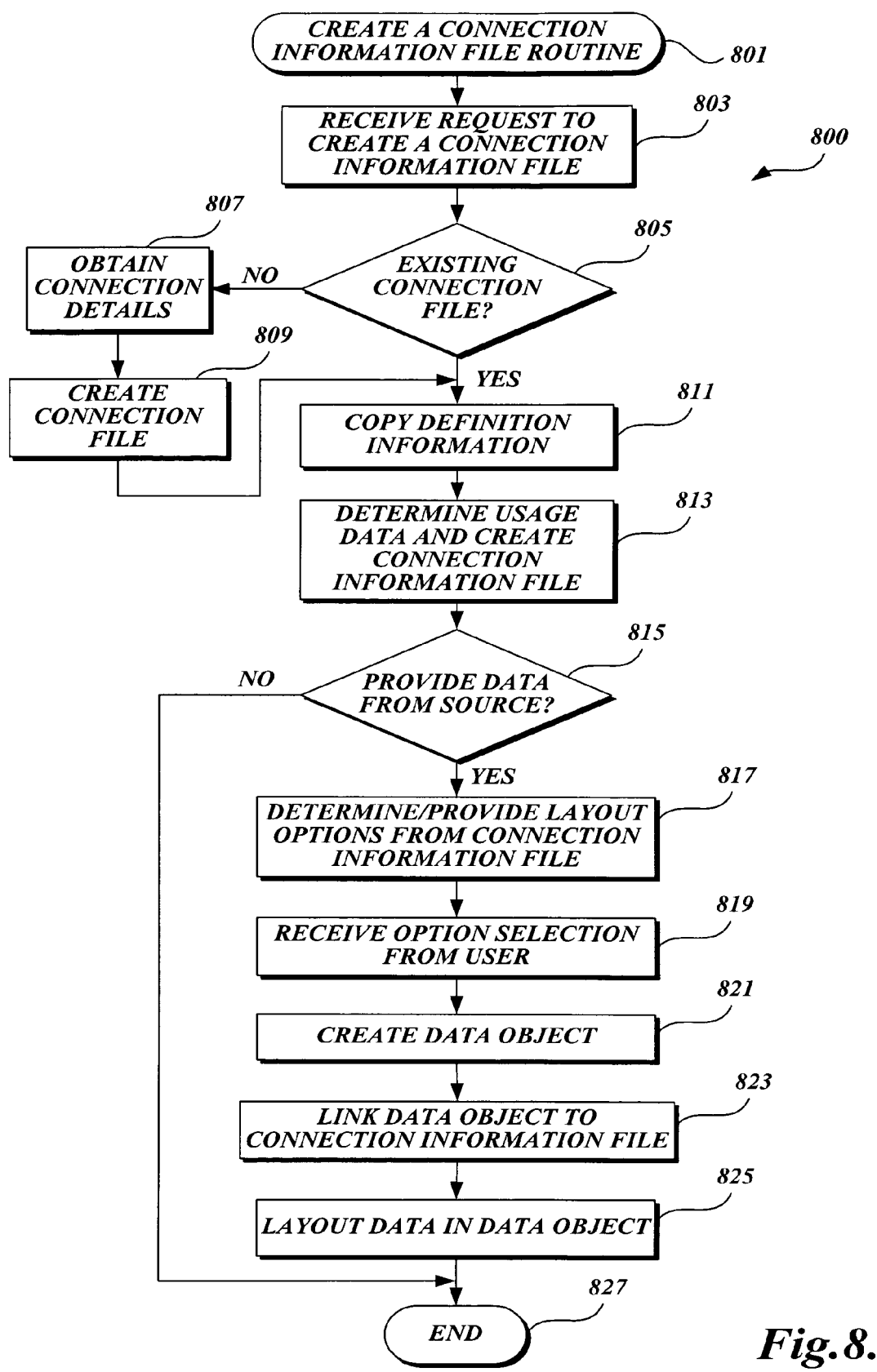
FIG. 8 is a flow diagram of a create Connection Information File routine for creating a Connection Information File in a workbook, in accordance with an embodiment of the present invention.

FIG. 8 is a flow diagram of a create Connection Information File routine for creating a Connection Information File in a workbook, in accordance with an embodiment of the present invention. The create Connection Information File routine begins at block 801 and at block 803 a request to create a Connection Information File in a workbook is received. At decision block 805 it is determined whether there is an existing connection file on the client machine or on a network to which the client machine has access. If it is determined at decision block 805 that there is no existing connection file, at block 807 connection details are obtained from the user. Connection details include the name of the external data source, how to connect to the external data source, etc. Once the connection details are obtained, at block 809 a connection file is created and stored on the client. Obtaining connection details and generation of a connection file is well known in the art of obtaining information from external data sources and will not be described in detail herein.

Upon creation of a connection file at block 809, or if it is determined at decision block 805 that a connection file exists, at block 811 the Definition Information from the connection file is copied into the workbook for which the request to create a Connection Information File was received. At block 813, Usage Information defining how the connection defined by the Connection Information File is to be used is determined and a Connection Information File containing both the Definition Information and the Usage Information is created and associated with the workbook that requested the creation of the Connection Information File. Usage data may be automatically defined based on, for example, the type of connection being created or by default parameters. Alternatively, the usage data may be manually provided by a user.

Upon creation of the Connection Information File at block 813, optionally at decision block 815, it may be determined if data from the defined external data source is to be provided. Data may be provided from the data source if a user selects to generate a data object using the created Connection Information File. If data is not to be provided from the external data source, the routine 800 completes at block 827. However, if it is determined at decision block 815 that data is to be provided from the external data source, at block 817 different layout options (e.g., tables, queries, formulas, graphs, etc.) for the data are determined from the Definition Information contained in the Connection Information File. Upon a determination of the different layout options, a user is provided with a choice of layouts for viewing the information obtained from the Connection Information File. Based on the selection received at block 819, an appropriate data object is created, as illustrated by block 821. Examples of data objects include, but are not limited to, formulas, data summary tables (also know as pivot tables), and queries. The data object is linked to the Connection Information File created at block 813. The data is then obtained from the external data source and, as illustrated by block 825, laid out in the created data object and displayed to a user. The routine 800 completes at block 827.

Figure 9:
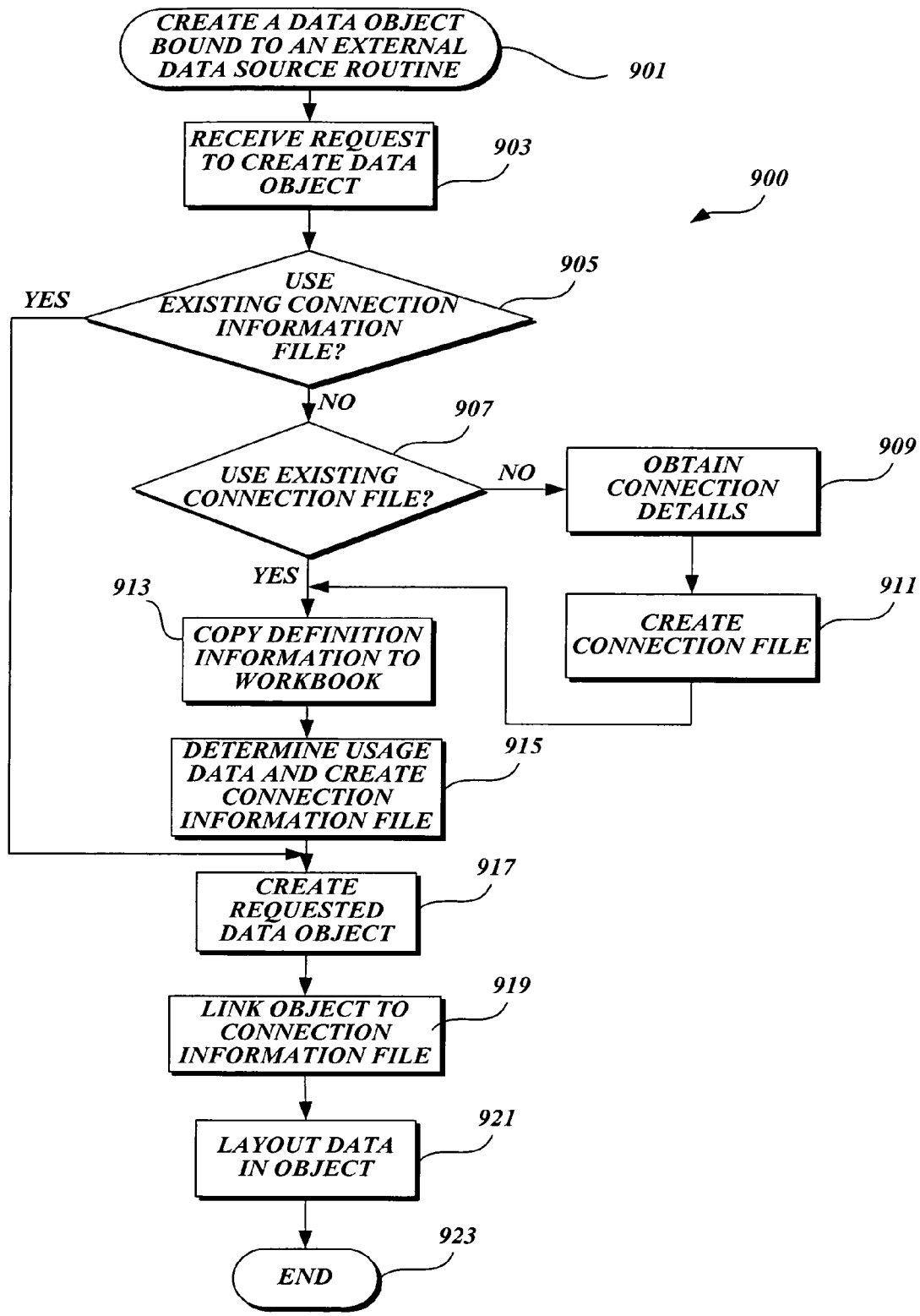
FIG. 9 is a flow diagram of a routine for creating a data object that is bound to an external data source, in accordance with an embodiment of the present invention.

FIG. 9 is a flow diagram of a routine for creating a data object that is bound to an external data source, in accordance with an embodiment of the present invention. The create data object bound to an external data source routine 900 begins at block 901 and at block 903 a request to create a data object within a workbook is received. At decision block 905, a determination is made as to whether an existing Connection Information File is to be used. If it is determined at decision block 905 that an existing Connection Information File is not to be used, at decision block 907 a determination is made as to whether an existing connection file, located on the client or a connected network, is to be used. If it is determined at decision block 907 that an existing connection file is not to be used, at block 909 connection details are obtained from the user. Connection details include the name of the external data source, how to connect to the external data source, etc. Once the connection details are obtained, at block 911 a connection file is created and stored on the client. Obtaining connection details and generation of a connection file is well known in the art of obtaining information from external data sources and will not be described in detail herein.

Upon creation of a connection file at block 911, or if it is determined at decision block 907 that a connection file exists, at block 913 the Definition Information from the connection file is copied into the workbook for which the request to create a data object was received. At block 915, Usage Information defining how the connection defined by the Connection Information File is to be used is determined and a Connection Information File containing both the Definition Information and the Usage Information is created and associated with the workbook that requested the creation of the Connection Information File. As discussed above, the Usage Information is unique to the workbook creating the Connection Information File. Included in the Usage Information is the refresh requirements defining how often data from the external data source is to be obtained and refreshed. Also included in the Usage Information is a name of the Connection Information File, as defined in the workbook. Usage data may be automatically defined based on, for example, the type of connection being created or by default parameters. Alternatively, the usage data may be manually provided by a user.

Upon creation of a Connection Information File, or if it is determined at decision block 905 that an existing Connection Information File is to be used, at block 917 the requested data object is created and at block 919 the created data object is linked to the newly created Connection Information File or the selected existing Connection Information File. The data is then obtained from the external data source and, as illustrated by block 921, laid out in the created data object. The routine 900 completes at block 827.

Figure 10:
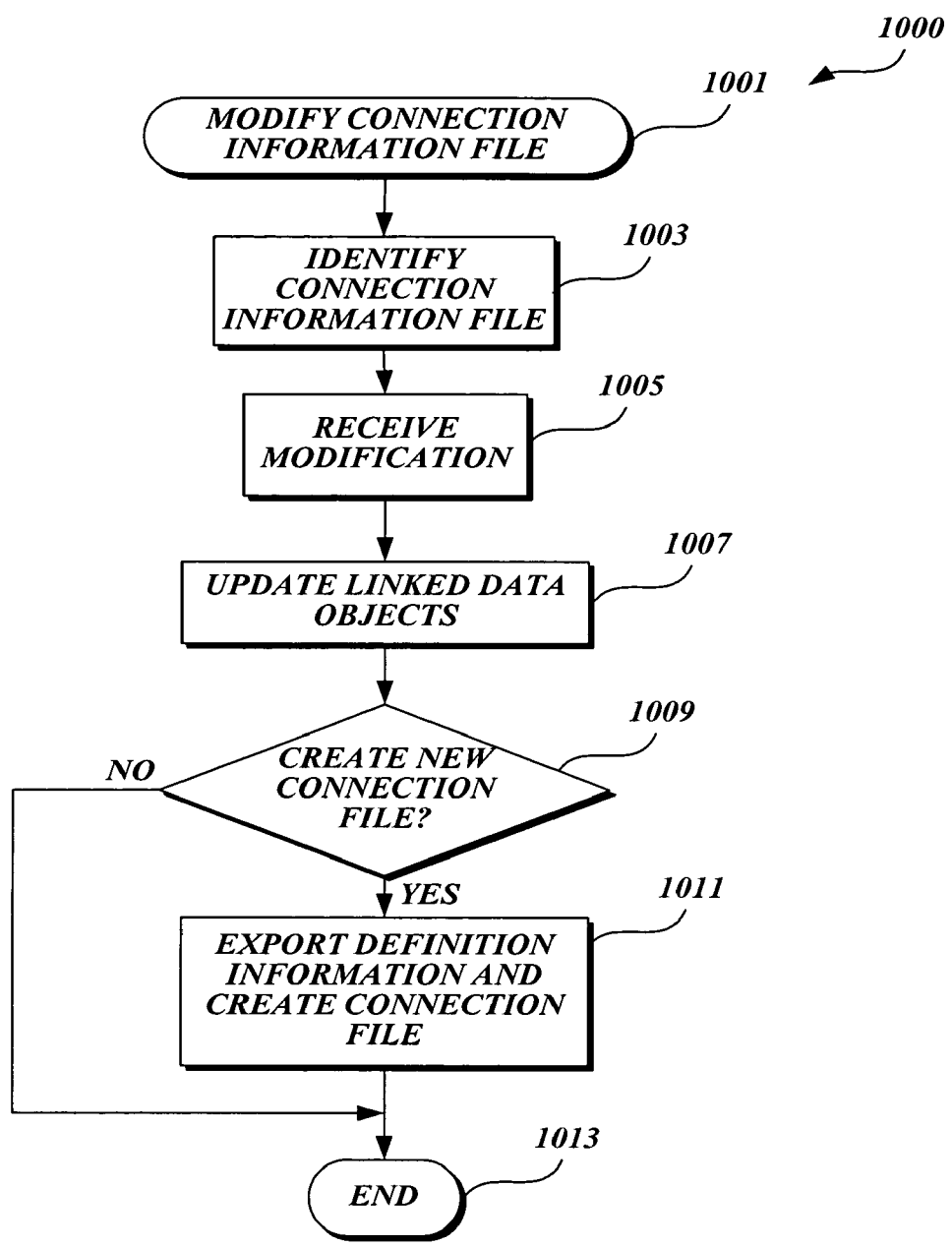
FIG. 10 is a flow diagram of a modify Connection Information File routine for modifying a Connection Information File that is used by one or more data objects of a workbook, in accordance with an embodiment of the present invention.

FIG. 10 is a flow diagram of a modify Connection Information File routine for modifying a Connection Information File that is used by one or more data objects of a workbook, in accordance with an embodiment of the present invention. The modify Connection Information File routine begins at block 1001 and at block 1003 a Connection Information File that is to be modified is identified. At block 1005, the modification to the Connection Information File is received and the Connection Information File is modified. As discussed above, a Connection Information File may be modified in a variety of manners. For example, a user may change the external data source to which the Connection Information File is defined to connect.

After the Connection Information File is modified, each of the linked data objects that use the Connection Information File to obtain data from the defined external data source is updated. In particular, the external data is obtained based on the modified Connection Information File and the new data is used by each of the linked data objects. At decision block 1009, a determination is made as to whether a new connection file, stored on the client or a connected network, is to be created. As discussed above, if a user modifies the Definition Information of a Connection Information File it will no longer match the Definition Information of the related connection file, and the relationship to the connection file may be removed. Thus, a user may desire to create a new connection file that includes the Definition Information contained in the modified Connection Information File. Creating a new connection file enables a user to use the Definition Information of the modified Connection Information File to create Connection Information Files in other workbooks or documents.

If it is determined at decision block 1009 that a new connection file is to be created, at block 1011 the Definition Information of the modified Connection Information File is exported from the workbook and a new connection file is created on the client. At block 1013, the modify Connection Information File routine 1000 completes.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-readable storage medium which stores a set of instructions which when executed performs a method for creating and managing Connection Information Files within an instance of an application, the method executed by the set of instructions comprising:

maintaining, by a Connection Information File management component, a list of existing Connection Information Files within the instance of the application, wherein each existing Connection Information File is an object within the instance of the application;

searching, by the Connection Information File management component, for existing connection files, wherein searching, by the Connection Information File management component, for the existing connection files comprises:
  searching a client computing device for the existing connection files, and
  searching a network for the existing connection files;
generating, by a Connection Information File generation component, a new Connection Information File for the instance of the application, wherein generating, by the Connection Information File generation component, the new Connection Information File for the instance of the application comprises determining a connection file defining a connection to an external source, wherein determining the connection file defining the connection to the external source comprises at least one of the following:
  providing the searched connection files for user selection,
  obtaining connection details including a name of the external source and how to connect to the external source; and
defining, by a Connection Information File linking component, one of the following: links between the existing Connection Information Files and data objects within the instance of the application and links between generated Connection Information Files and the data objects within the instance of the application, wherein the existing Connection Information Files are independent of the data objects.

2. The computer-readable medium of claim 1, wherein the existing Connection Information Files each include information defining a connection to the external data source.

3. The computer-readable storage medium of claim 1, wherein at least one of the existing Connection Information Files is linked to at least two of the data objects within the instance of the application.

4. The computer-readable storage medium of claim 3, wherein the at least two data objects are selected from a group of data objects including a data summary table, a formula, and a query.

5. The computer-readable storage medium of claim 1, wherein the existing Connection Information Files are independent of the data objects.

6. The computer-readable storage medium of claim 1, wherein at least one of the existing Connection Information Files is linked to by at least two of the data objects; and
  wherein the at least one Connection Information File is modified and the at least two linked data objects are automatically updated to reflect the modification.

7. The computer-readable storage medium of claim 1, wherein the Connection Information File management component generates a user interface identifying a name of each existing Connection Information File.

8. The computer-readable storage medium of claim 1, wherein the existing Connection Information Files include Usage Information and Definition Information.

9. The computer-readable storage medium of claim 8, wherein the Definition Information defines how access to the external data source is to be accomplished.

10. The computer-readable storage medium of claim 8, wherein the Usage Information defines how a connection to the external data source defined by the existing Connection information Files is to be used for the instance of the application.

11. The computer-readable storage medium of claim 8, wherein the Usage information is unique to the instance of the application.

12. The computer-readable storage medium of claim 8, wherein the Definition Information is obtained from the connection file.

13. A method for creating a Connection Information File within an instance of an application, the method comprising:
  receiving a request to create the Connection Information File;
  determining if an applicable connection file exists, the applicable connection file comprising information used to generate the Connection Information File, wherein determining if the connection file exists comprises at least one of the following:
  automatically searching, by a software component operative to locate existing connection files, a client computing device for the existing connection files and a network for the existing connection files;
  in response to a determination that the connection file exists:
    providing the located existing connection files for user selection,
    receiving a user selection of the applicable connection file of the existing connection files, and
    copying, into the instance of the application, Definition Information from the applicable connection file;
  determining Usage Information defining how the Connection Information File is to be used in the instance of the application; and
  creating a Connection Information File within the instance of the application that includes the Definition Information and the Usage information, wherein the Connection Information File is an independent object within the instance of the application.

14. The method of claim 13, further comprising:
  defining a data object that is to obtain information from an external data source identified by the Connection Information File; and
  linking the data object to the Connection Information File.

15. The method of claim 13, further comprising:
  determining if data from an external data source identified by the Connection Information File is to be provided to a user;
  in response to a determination that the data from the external source is to be provided, determining a layout for the external data based on information contained in the Connection Information File;
  obtaining the external data from the external data source;
  laying out the external data in a data object; and
  providing a data object containing the external data to a user.

16. A method for creating a new data object within an instance of an application, wherein the new data object is configured to obtain data from an external data source, comprising:
  providing, within the instance of the application, a connections window comprising the following:
    at least one existing data object,
    a connection type associated with the at least one existing data object,
    a connection description for the at least one existing data object,
    a first option to remove the at least one existing data object, and
    a second option to request a creation of the new data object;

receiving the request to create the new data object;
determining if a Connection Information File exists within the instance of the application, the Connection Information File comprising information used to define a connection to the external data source;
in response to a determination that the Connection Information File does not exist, determining if a connection file exists, the connection file comprising information used to define the connection to the external data source, wherein determining if the connection file exists comprises:
  automatically searching, by a software component operative to automatically locate existing connection files, a client computing device for the existing connection files,
  automatically searching, by the software component, a network for the existing connection files, and
  providing the existing connection files for user selection;
in response to a determination that the connection file exists, receiving the user selection of an applicable connection file from the existing connection files;
creating, in response to receiving the user selection of the applicable connection file from the existing connection files, the Connection Information File within the instance of the application based off the information contained in the applicable connection file;

determining a layout for the obtained data within the created new data object;
creating the requested new data object based on obtained data from the external data source and determined layout; and
in response to creating the Connection Information File, or in response to determining that the Connection Information File exists, linking the new data object to the Connection Information file.

17. The method of claim 16, wherein creating the Connection Information File further includes:
  copying Definition Information from the connection file;
  defining Usage Information identifying how the instance of the application will access the external data source; and
  creating the Connection Information File that includes the Definition Information and the Usage Information.

18. The method of claim 16, wherein the Connection Information File is an independent object within the instance of the application.

19. The method of claim 16, wherein the Connection Information File is configured to be used by a plurality of data objects within the instance of the application to connect to the external data source.

* * * * *

UNITED STATES PATENT AND TRADEMARK OFFICE
CERTIFICATE OF CORRECTION

| | | |
|---|---|---|
| PATENT NO. | : 7,653,731 B2 | |
| APPLICATION NO. | : 11/361502 | |
| DATED | : January 26, 2010 | |
| INVENTOR(S) | : Alexander Martynov et al. | |

It is certified that error appears in the above-identified patent and that said Letters Patent is hereby corrected as shown below:

In column 10, line 59, in Claim 1, delete "per forms" and insert -- performs --, therefor.

In column 11, line 32, in Claim 2, after "computer-readable" insert -- storage --.

Signed and Sealed this
Eighth Day of February, 2011

David J. Kappos
*Director of the United States Patent and Trademark Office*